United States Patent [19]

Doodson

[11] Patent Number: 5,269,412
[45] Date of Patent: Dec. 14, 1993

[54] CASSETTE WITH A MAGNETIC TAPE

[75] Inventor: Peter J. Doodson, Eindhoven, Netherlands

[73] Assignee: U.S. Philips Corporation, New York, N.Y.

[21] Appl. No.: 911,820

[22] Filed: Jul. 10, 1992

[30] Foreign Application Priority Data

Aug. 7, 1991 [DE] Fed. Rep. of Germany ....... 9109790

[51] Int. Cl.⁵ ..................... B65D 85/575; G11B 23/04
[52] U.S. Cl. ..................................... 206/393; 40/340; 40/663; 206/459.5; 242/199
[58] Field of Search .................. 40/299, 340, 625, 662, 40/663; 206/389, 393, 459.5; 242/199, 200

[56] References Cited

U.S. PATENT DOCUMENTS

| | | |
|---|---|---|
| 3,718,290 | 2/1973 | Wright ............................... 242/199 |
| 3,721,772 | 7/1973 | Miura et al. . | 
| 4,012,011 | 3/1977 | Saito . |
| 4,119,200 | 10/1978 | Cassidy et al. ................... 206/459.5 |
| 4,773,614 | 9/1988 | Makino et al. . |
| 5,054,616 | 10/1991 | Gelardi et al. . |

FOREIGN PATENT DOCUMENTS

| | | | |
|---|---|---|---|
| 2709987 | 9/1978 | Fed. Rep. of Germany ...... 242/199 |
| 3223414 | 12/1983 | Fed. Rep. of Germany ........ 40/299 |
| 2121585 | 12/1983 | United Kingdom ................... 40/625 |

Primary Examiner—Jimmy G. Foster
Attorney, Agent, or Firm—Brian J. Wieghaus

[57] ABSTRACT

A cassette (1) includes a housing (3) with two parallel main walls (5, 7), of which one wall has a recessed portion (25). The recessed portion (25) accommodates an element (22) whose picture, or information carrying, side (23) is visible. The element (22) can be fitted int he recessed portion (25) in only one position owing to the provision of offcentered projections (33,35).

11 Claims, 2 Drawing Sheets

CASSETTE WITH A MAGNETIC TAPE

BACKGROUND OF THE INVENTION

The innovation relates to a cassette comprising a housing having two parallel main walls, of which at least one wall is provided with a recessed portion having a bounding wall extending parallel tot he main wall, said recessed portion accommodating an element having a picture side and a rear side.

A cassette of the type defined in the opening paragraph is known from EP-A 0,233,028. In this prior-art cassette the recessed portion has been provided with an information-carrying element. This information may include, for example, the playing time of the cassette or the brand name. Such a known element is generally made of paper or paperboard and is generally stuck onto the bounding wall of the recessed portion, which is expensive. Moreover, such an element cannot readily be replaced.

SUMMARY OF THE INVENTION

It is an object of the innovation to provide a cassette of the type defined in the opening paragraph, enabling cassette-related information to be applied and replaced in a simple manner.

To this end the cassette in accordance with the innovation is characterised in that the bounding wall of the recessed portion and the rear side of the element are provided with at least one opening and a projection engageable in the opening, the element being affixed tot he housing by clamping. This enables the element to be latched in the recessed portion and to be clamped in position by a further wall of the recessed portion, which wall extends perpendicularly to the main walls or the projection in the opening. As result of this, it is no longer necessary to use an adhesive, so that the element can be affixed and replaced in a simple manner. According to the innovation the element is preferably made of a plastics, for example a hard plastics, so that it is stronger and easier to replace than the known paper or paperboard element.

Therefore, an embodiment of the cassette in accordance with the innovation is characterised in that the opening is formed in the bounding wall and the projections is arranged on the element in such a way that the element can be fitted in the recessed portion in only one position. This ensures that the element can be mounted only in the desired position and prevents the element from being mounted in an incorrect position.

A further embodiment of the cassette in accordance with the innovation is characterised in that the bounding wall has a further opening which is in alignment with the said opening, the line of alignment being disposed off the center of the recessed portion, and the element comprises a further projection which is also in alignment with the said projection and whose line of alignment is disposed off the center of the element. The use of two projections even further reduces the likelihood of the element being fitted in an incorrect position.

The drawings show embodiments of the innovation, which will be described in more detail hereinafter.

DESCRIPTION OF THE PREFERRED EMBODIMENTS

Figure 1:
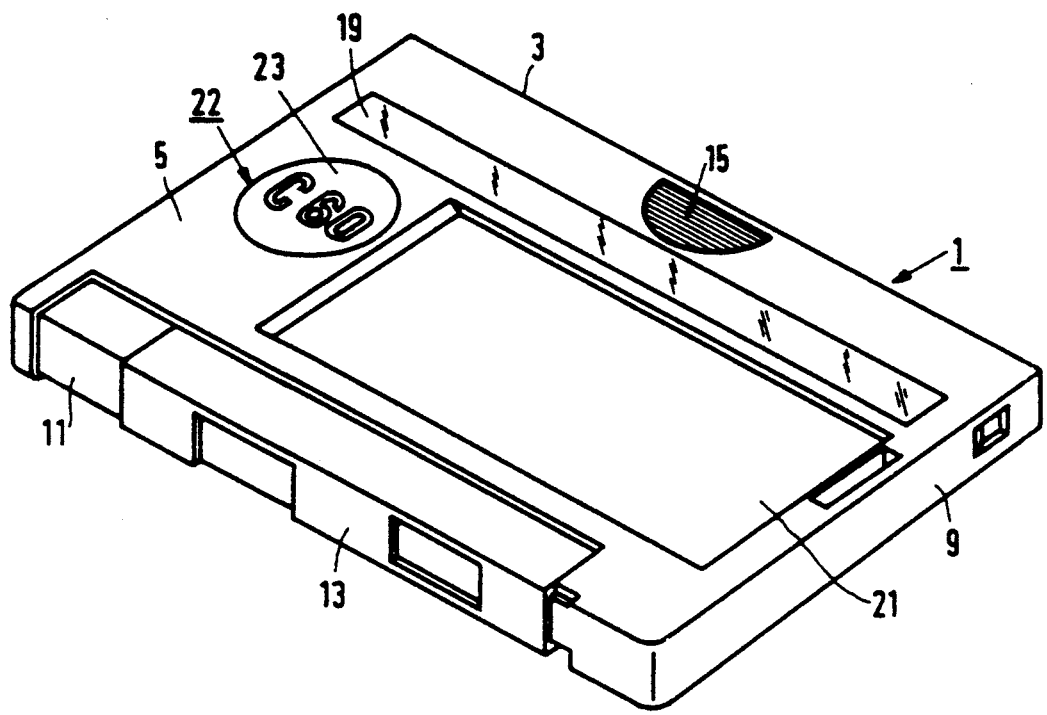
FIG. 1 is a perspective view of a cassette provided with an element in accordance with the innovation.
Figure 4:
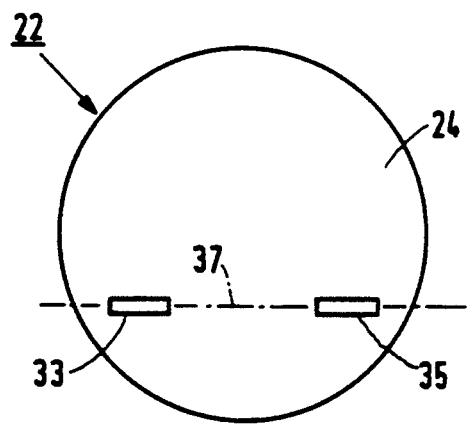
FIG. 4 is a rear view of the element.
Figure 2:
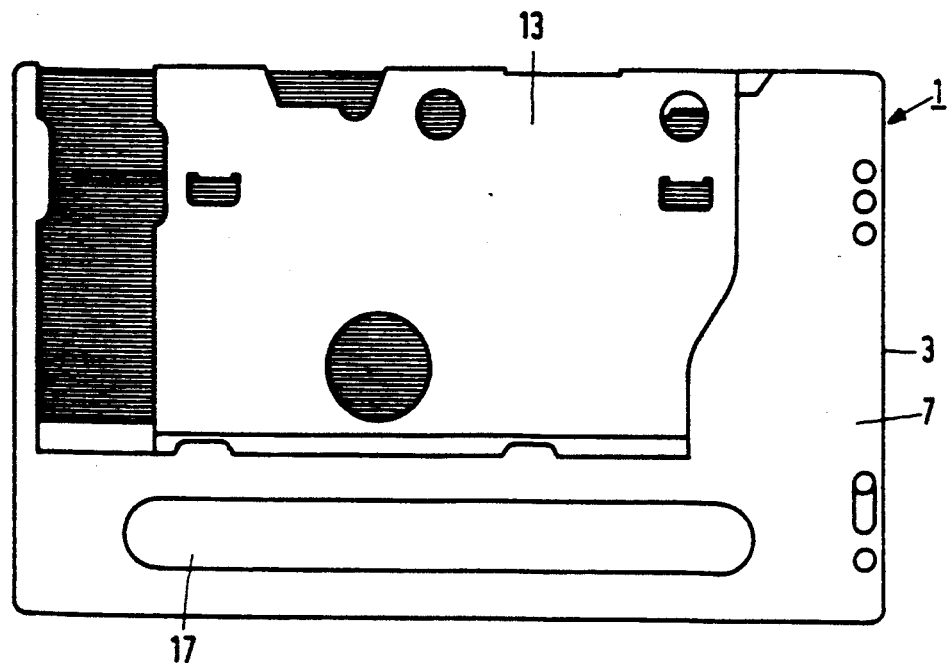
FIG. 2 is a plan view at a main wall of the cassette.

FIG. 1 shows a cassette 1 with a housing 3 having two parallel main walls 5, 7 and several transverse walls 9, 11 connecting the main walls. One of the transverse walls forms a front wall 11 having openings which can be closed by means of a sliding cover 13. The housing 3 accommodates magnetic tape on two reels (not shown in the drawings). The main wall 5 has a recessed portion 25 (see FIG. 3) in which the information-carrying element 22 is situated. The element 22 has a picture side 23 and a rear side (see FIG. 4). The picture side 23 has been provided with information about the playing time of the cassette. The main wall 5 comprises a window 19 through which the reels are visible, so that a user can see the amount of magnetic tape available on each of the two reels. The main wall 5 further has a recessed portion which can accommodate a sticker with data relating to the information recorded on the magnetic tape. The housing 3 also has further recesses 15 and 17 to provide a better grip on the cassette 1 when it is to be removed from a holder. FIG. 2 shows the other main wall 7 of the cassette 1 with the further recessed portion 17.

Figure 3:
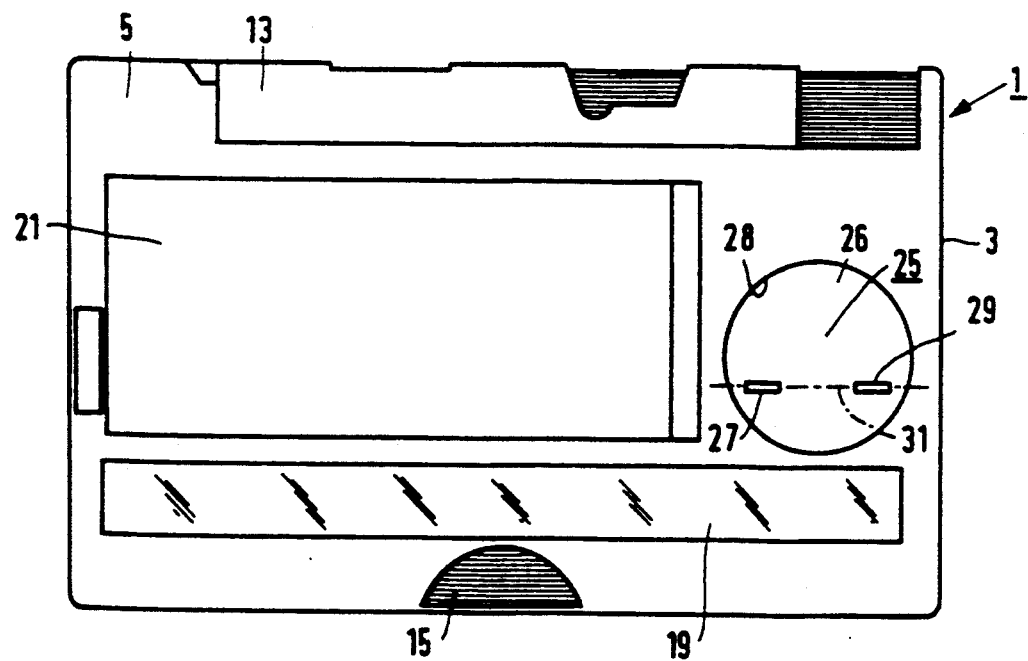
FIG. 3 is a plan view at the further main wall of the cassette.

FIG. 3 shows the cassette 1 without the information-carrying element. A bounding wall 26 of the recessed portion 25, which wall extends parallel to the main wall 5, has two openings 27 and 29 disposed on an imaginary line 31 off the center of the recessed portion 25. The rear 24 of the element 22, see FIG. 4, carries two projections 33 and 35 on a further imaginary line 37 disposed off the center of the element 22. Consequently, the element 22 can be fitted in the recessed portion 25 in only one position. The element 22 is clamped onto the housing 3. This can be achieved in that the projections 33 and 35 are clamped between the bounding walls of the openings 27 and 29. However, in the present example the element 22 is clamped relative to a further bounding wall 28 of the recessed portion 25, which wall extends perpendicularly to the main wall 5. The likelihood of the projection breaking off when the element 22 is fitted or replaced is now smaller than in the case of clamping by means of the projections.

It is to be noted that although in the foregoing the innovation has been described with reference to the drawings this does not mean that the innovation is limited to the exemplary embodiments shown in the drawings. The innovation also relates to all those embodiments which differ from those shown in the drawings within the scope defined in the Claims and based on the principle underlying the innovation. For example, a larger rectangular element may be provided in the recessed portion 21 instead of a sticker.

I claim:

1. A cassette comprising a housing having two parallel main walls, one of said main walls including a recessed portion having a bounding wall extending parallel to said main wall, and an information carrying element secured in said recessed portion and having an information-carrying side and a rear side, characterised in that: said bounding wall of said recessed portion and said rear side of said element include an opening and a projection engageable in said opening arranged such that said information-carrying element can be fitted in said recessed portion in only one position, the element being affixed to the housing by clamping.

2. A cassette as claimed in claim 1, characterised in that said opening is formed in said bounding wall and said projections is arranged on said information-carrying element.

3. A cassette as claimed in claim 2, characterised in that said bounding wall has a further opening which is in alignment with the said opening, the line of alignment between said openings being disposed off the center of said recessed portion, and said information-carrying element comprises a further projection which is also in alignment with the said projection and whose line of alignment is disposed off the center of said information-carrying element.

4. A magnetic tape cassette having a pair of parallel main walls, one of said walls including a recessed portion having a bounding wall extending parallel to said one main wall, and an information carrying element secured in said recessed portion and having a rear wall facing said bounding wall and an information carrying side facing away from said bounding wall, wherein the improvement comprises:

said bounding wall of said recessed portion and said rear wall of said information carrying element include an opening and a projection engageable in said opening such that said information carrying element is placeable in said recessed portion in only one orientation, and said recessed portion and said information carrying element each include a peripheral wall, said peripheral walls including retaining means for retaining said information carrying element in said recessed portion with a removable clamping fit.

5. A magnetic tape cassette according to claim 4, wherein said projection does not have a clamping fit in said opening.

6. A magnetic tape cassette according to claim 5, wherein said opening is formed in said bounding wall and said projection is arranged on said rear wall of said information carrying element.

7. A magnetic tape cassette according to claim 6, wherein said bounding wall includes two of said openings and said rear wall of said information carrying element includes two of said projections.

8. A magnetic tape cassette apparatus according to claim 7, wherein both of said openings and both of said projections are aligned on a line of alignment offset from the center of said recessed portion.

9. A magnetic tape cassette according to claim 4, wherein said opening is formed in said bounding wall and said projection is arranged on said rear wall of said information carrying element.

10. A magnetic tape cassette according to claim 4, wherein said bounding wall includes two of said openings and said rear wall of said information carrying element includes two of said projections.

11. A magnetic tape cassette apparatus according to claim 10, wherein both of said openings and both of said projections are aligned on a line of alignment offset from the center of said recessed portion.

* * * * *